(12) United States Patent
Narita (10) Patent No.: US 6,614,208 B2
(45) Date of Patent: Sep. 2, 2003

(54) SOFT SWITCHING DC-TO-DC CONVERTER AND CONTROLLING METHOD THEREOF

(75) Inventor: Yuki Narita, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/805,936

(22) Filed: Mar. 15, 2001

(65) Prior Publication Data

US 2001/0036085 A1 Nov. 1, 2001

(30) Foreign Application Priority Data

Mar. 15, 2000 (JP) ........................................ 2000-071660

(51) Int. Cl.$^7$ .............................. G05F 1/40; G05F 1/44
(52) U.S. Cl. ....................................... 323/283; 323/224
(58) Field of Search ................................ 323/282, 283, 323/284, 235, 224

(56) References Cited

U.S. PATENT DOCUMENTS

| | | | | |
|---|---|---|---|---|
| 4,265,200 A | * | 5/1981 | Wessel et al. ................ | 123/487 |
| 4,581,569 A | * | 4/1986 | Fujioka et al. ............... | 318/803 |
| 5,262,932 A | * | 11/1993 | Stanley et al. ............... | 323/272 |
| 5,777,461 A | * | 7/1998 | Massie et al. ............... | 323/282 |
| 5,801,519 A | * | 9/1998 | Midya et al. ................ | 323/222 |
| 5,872,710 A | * | 2/1999 | Kameyama ................. | 363/131 |
| 5,933,344 A | * | 8/1999 | Mitsuishi et al. ............. | 700/12 |

FOREIGN PATENT DOCUMENTS

JP    7046853    2/1995

OTHER PUBLICATIONS

"Inverters without transformer in grid connected photovoltaic applications", Proceedings of 6$^{th}$ European Conference on Power Electronics and Application (EPE '95), vol. 3, Sevilla, Sep. 1995, pp. 3.086–3.091.

* cited by examiner

Primary Examiner—Shawn Riley
(74) Attorney, Agent, or Firm—Oliff & Berridge PLC (57) ABSTRACT

A DC-to-DC converter for zero-voltage or zero-current switching (soft switching). The converter minimizes noise and power losses when turning-on and turning-off switching devices. The converter includes a switching circuit, error amplifier, pulse-width modulator, differentiator and dead time adjusting circuit. The error amplifier compares an output voltage to a reference voltage and the pulse-width modulator adjusts the output pulse in accordance with the comparison result of the error amplifier. The differentiator outputs a differentiated signal $dV_{Sx}/dt$ of the output voltage $V_{S_X}$ of the switching circuit, indicating over current flow in a switching device. The dead time adjusting circuit adjusts the dead time period to optimize the dead time period when it detects a peak in the differentiated signal $dV_{Sx}/dt$.

15 Claims, 10 Drawing Sheets

| CONDITION OF DEAD TIME A OR B | DIRECTION OF PEAK | OPERATION TO COUNTER 46 OR 48 | EFFECT |
|---|---|---|---|
| A IS SHORT | POSITIVE DIRECTION | COUNTS UP COUNTER 46 | DELAY TURN ON Q1 = LENGTHEN DEAD TIME A |
| A IS LONG | NEGATIVE DIRECTION | COUNTS DOWN COUNTER 46 | FASTEN TURN ON Q1 = SHORTEN DEAD TIME A |
| B IS LONG | POSITIVE DIRECTION | COUNTS DOWN COUNTER 48 | FASTEN TURN ON Q2 = SHORTEN DEAD TIME B |
| B IS SHORT | NEGATIVE DIRECTION | COUNTS UP COUNTER 48 | DELAY TURN ON Q2 = LENGTHEN DEAD TIME B |

SOFT SWITCHING DC-TO-DC CONVERTER AND CONTROLLING METHOD THEREOF

BACKGROUND OF THE INVENTION

1. Field of Invention

This invention relates to zero-voltage or zero-current switching ("soft switching") of DC-to-DC converters comprising at least a pair of switching devices.

2. Description of Related Art

DC-to-DC converters are used to obtain a specified DC voltage in a power circuit. Noise and power losses occur in DC-to-DC converters when turning-on and turning-off the switching devices. The soft switching technique is known, so far, for decreasing noise and power losses. Resonant DC-to-DC converter and inductor commutating circuits, etc. are proposed as a means to achieve soft switching.

Figure 10:
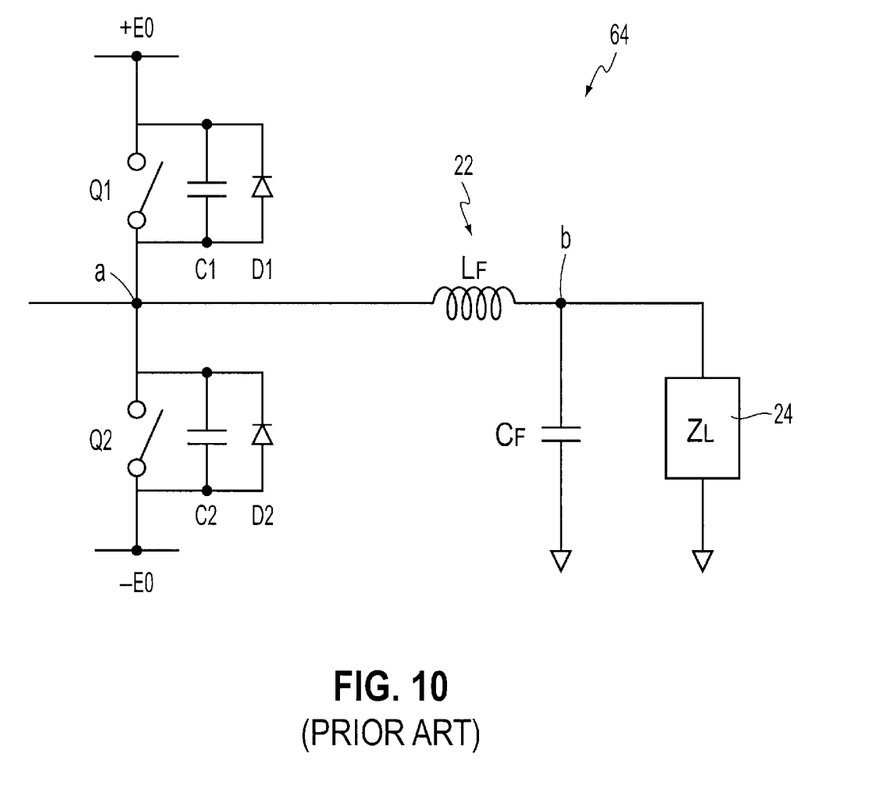
FIG. 10 illustrates a schematic diagram of a soft switching inverter according to the related art.

For instance, Japanese Patent Unexamined Publication 7-46853 discloses a half-bridge soft switching inverter and controlling method thereof. Soft switching inverter 64 of the publication is shown in FIG. 10. A pair of switching devices Q1 and Q2 are connected in series between +E0 volt and −E0 volt. Output filter 22 is connected to output node a. Load ($Z_L$) 24 is connected to output node b of output filter 22. Capacitors C1, C2, and diodes D1, D2 are connected to the switching devices Q1 and Q2 in parallel at both ends of Q1 and Q2, respectively. Output filter 22 is composed of inductor $L_F$, connected between output node a and output node b, and capacitor $C_F$ connected between output node b and ground. Load 24 is connected between output node b and ground. Inverter controller 64 can output an objective DC voltage between +E0 and −E0 volt, as an output voltage, by switching the switching devices Q1 and Q2 in a timely manner. However, direct current flows from +E0 to −E0, when the both switching devices Q1 and Q2 turn on at the same time. As a result, power loss becomes very large, and the switching devices Q1 and Q2 suffer damages.

In an attempt to overcome the problems described above, it is generally known to have a dead time, that turns off both the switching devices Q1 and Q2 simultaneously, in switching the Q1 and Q2.

Figure 5:
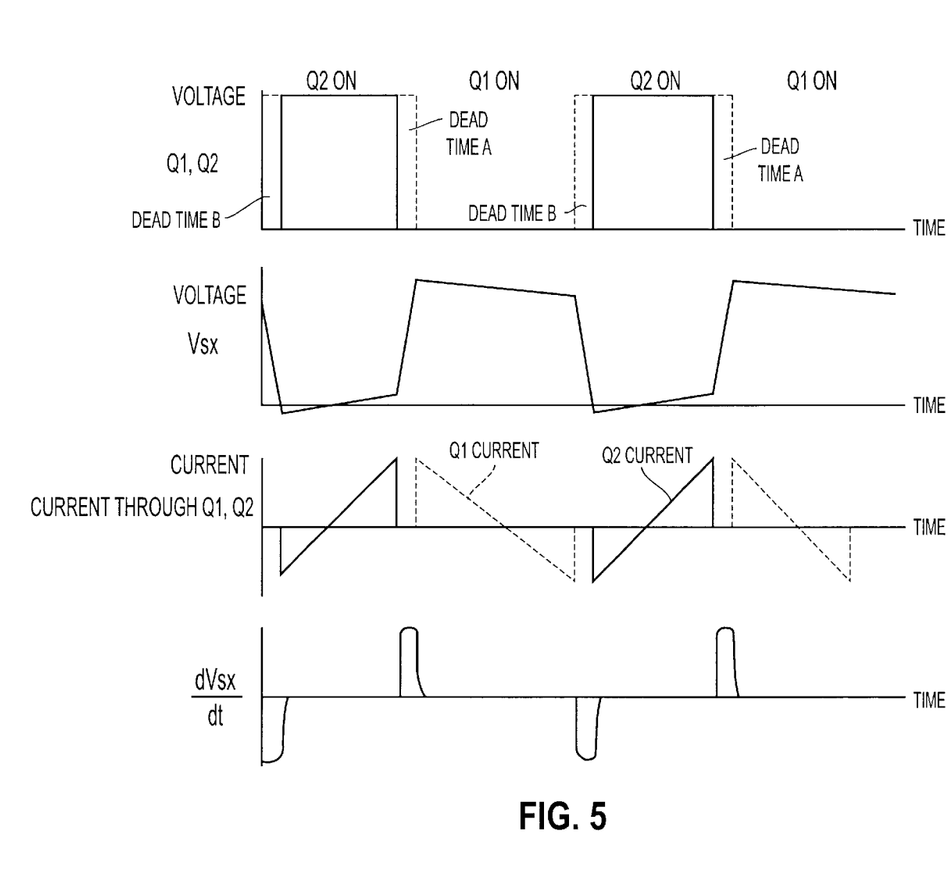
FIG. 5 is a timing chart showing the operation of the converter when the dead time A and B is set properly.

Output voltage of output node a of the inverter controller 64, having an ideal dead time, is shown in FIG. 5. The voltage of output node a changes by switching of Q1, Q2, and resonating of the inductor $L_F$ and the capacitor $C_F$. The output voltage of output node a for the period of dead time changes along with the electrical charge and discharge of capacitors C1 and C2 connected with Q1 and Q2 in parallel, respectively. These voltage changes are very rapid compared with the voltage changes in the period when Q1 or Q2 is turned on.

Figure 6:
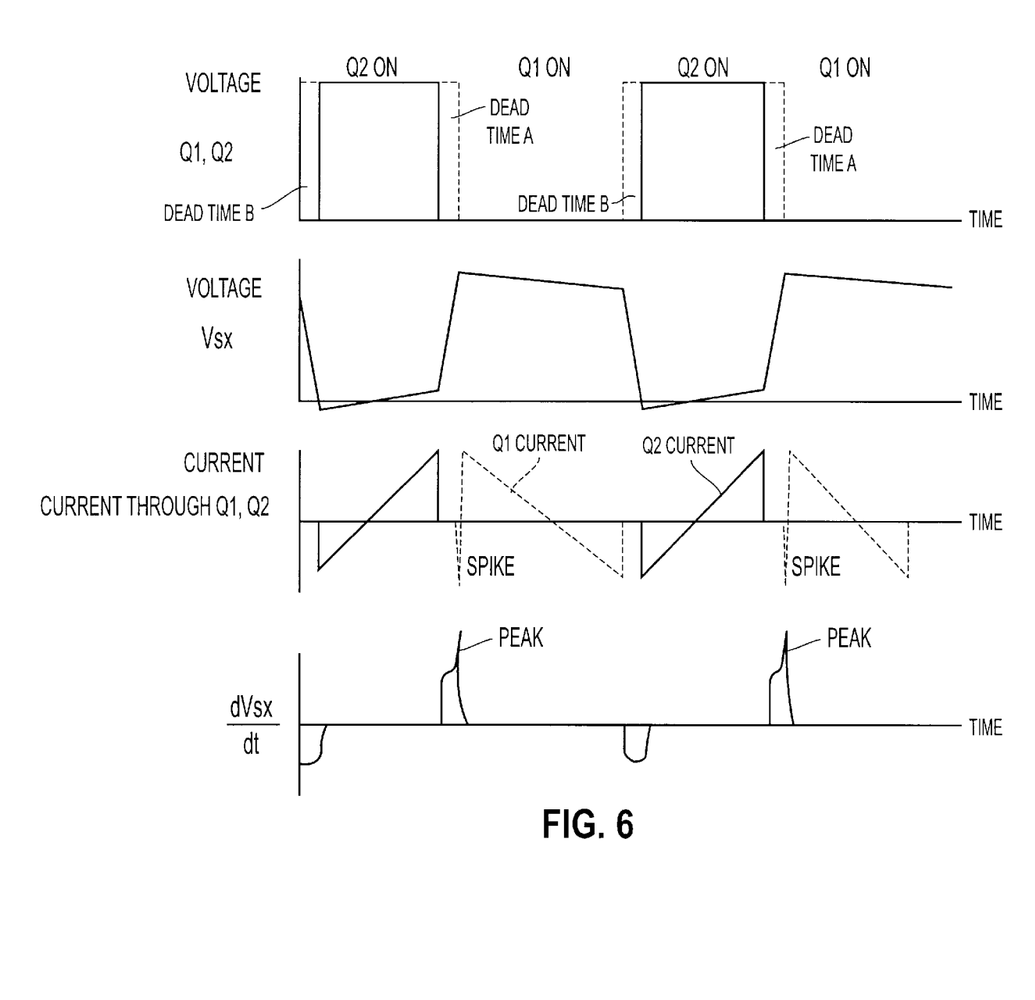
FIG. 6 is a timing chart showing the operation of the converter when the dead time A is shorter than normal.

FIG. 6 shows voltages of switching devices Q1 and Q2, output voltage VSx of the node a, flowing currents in Q1 and Q2 and the time differentiated signal output voltage dVSx/dt, when the dead time A is shorter than an ideal period. At the moment Q1 turns on earlier than the ideal dead time A, the output node a is pulled up rapidly. As a result, an excessive current momentarily flows in Q1.

Figure 7:
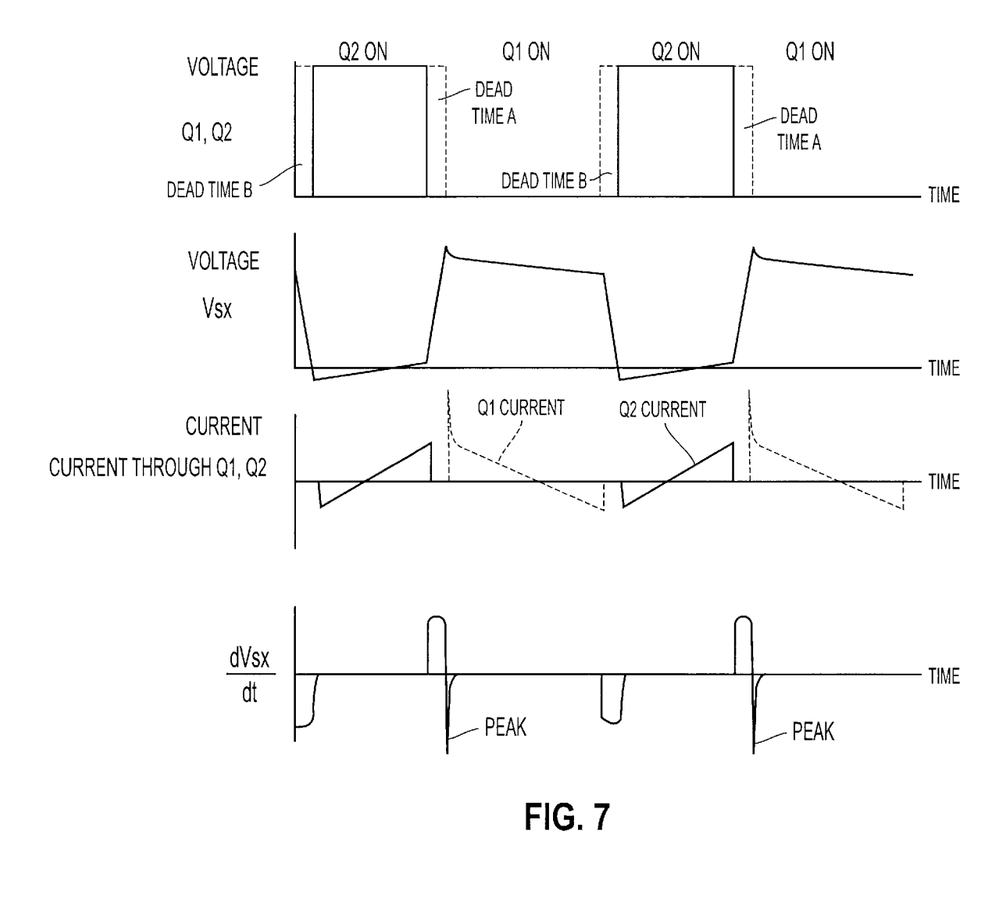
FIG. 7 is a timing chart showing the operation of the converter when the dead time A is longer than normal.

On the contrary, when the dead time A is longer than the ideal period as shown in FIG. 7 and Q1 remains turned-off longer than the ideal period, the output voltage VSx of node a becomes higher than the power-supply voltage. Afterwards, at the moment Q1 turns on, the output voltage of node a is pulled down rapidly. As a result, an excessive current momentarily flows in Q1.

Figure 8:
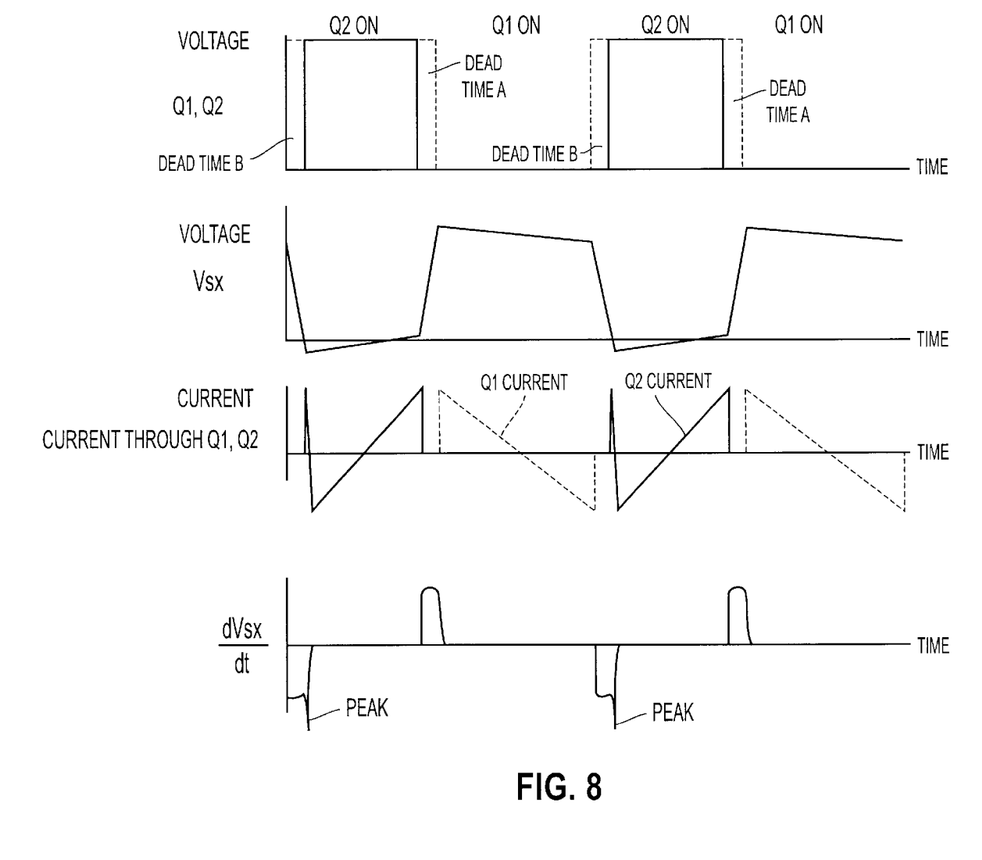
FIG. 8 is a timing chart showing the operation of the converter when the dead time B is shorter than normal.
Figure 9:
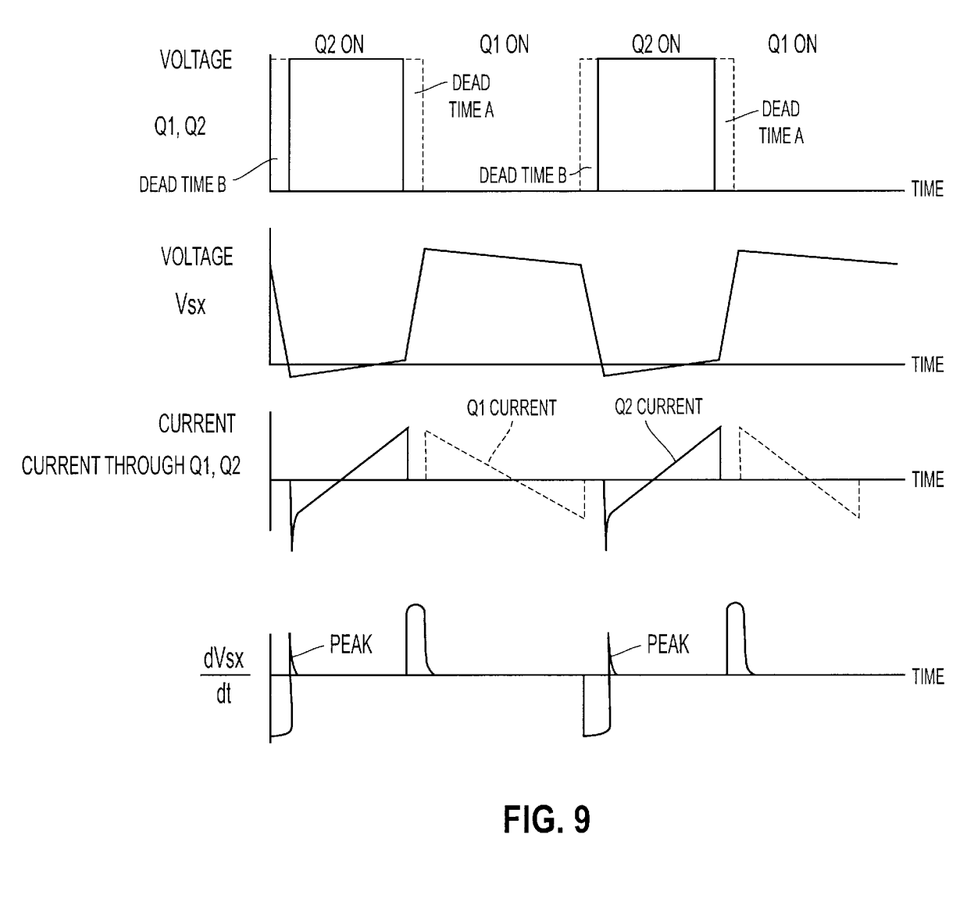
FIG. 9 is a timing chart showing the operation of the converter when the dead time B is longer than normal.

A similar phenomenon occurs on the switching device Q2 as shown in FIGS. 8 and 9.

Japanese Patent Unexamined Publication 7-46853 discloses that when the output voltage of node a becomes equal to a certain set reference voltage, then the switching device Q1 or Q2 is turned on. Therefore, switching noise and switching power losses can be decreased by above mentioned zero voltage switching.

However, when there is a rapid pull-up and rapid pull-down in the current value flowing in the switching devices Q1 and Q2 as shown in FIGS. 6 through 9, it is very difficult to determine when the output voltage of node a is equal to the set reference voltage. Also, it is difficult to measure the output voltage with high accuracy, and with high speed. Therefore, it was very difficult to achieve the teaching of 7-46853, realistically.

SUMMARY OF THE INVENTION

This invention provides a soft switching DC-to-DC converter usable to reduce noise and power losses attributed to the turning on and turning off of switching devices. The present invention substantially eliminates the over current flow attributed to a switching device turning on before the end of the dead time period, or a switching device remaining off beyond the dead time period. This invention separately provides a method for controlling a DC-to-DC converter.

In various exemplary embodiments the DC-to-DC converter includes a switching circuit, error amplifier, pulse-width modulator, differentiator and dead time adjusting circuit. The error amplifier compares a voltage output to a reference voltage, and generates a comparison result. The pulse-width modulator adjusts the output pulse in accordance with the comparison result from the error amplifier. The differentiator outputs a differentiated signal dVSx/dt of the output voltage VSx of the switching circuit. The differentiated signal dVSx/dt outputs a signal that indicates whether there has been an over current in either the positive or negative direction. Typically, the over current flow will generate a peak in the differentiated signal. The dead time adjusting circuit adjusts the dead time period when it detects a spike or peak in the differentiated signal dVSx/dt to obtain the appropriate dead time period.

These and other features and advantages of this invention are described in, or apparent from, the following detailed description of the devices and methods according to this invention.

BRIEF DESCRIPTION OF THE DRAWINGS

The invention will be explained in more detail in conjunction with the appended drawings, wherein.

DETAILED DESCRIPTION OF PREFERRED EMBODIMENTS

Figure 1:
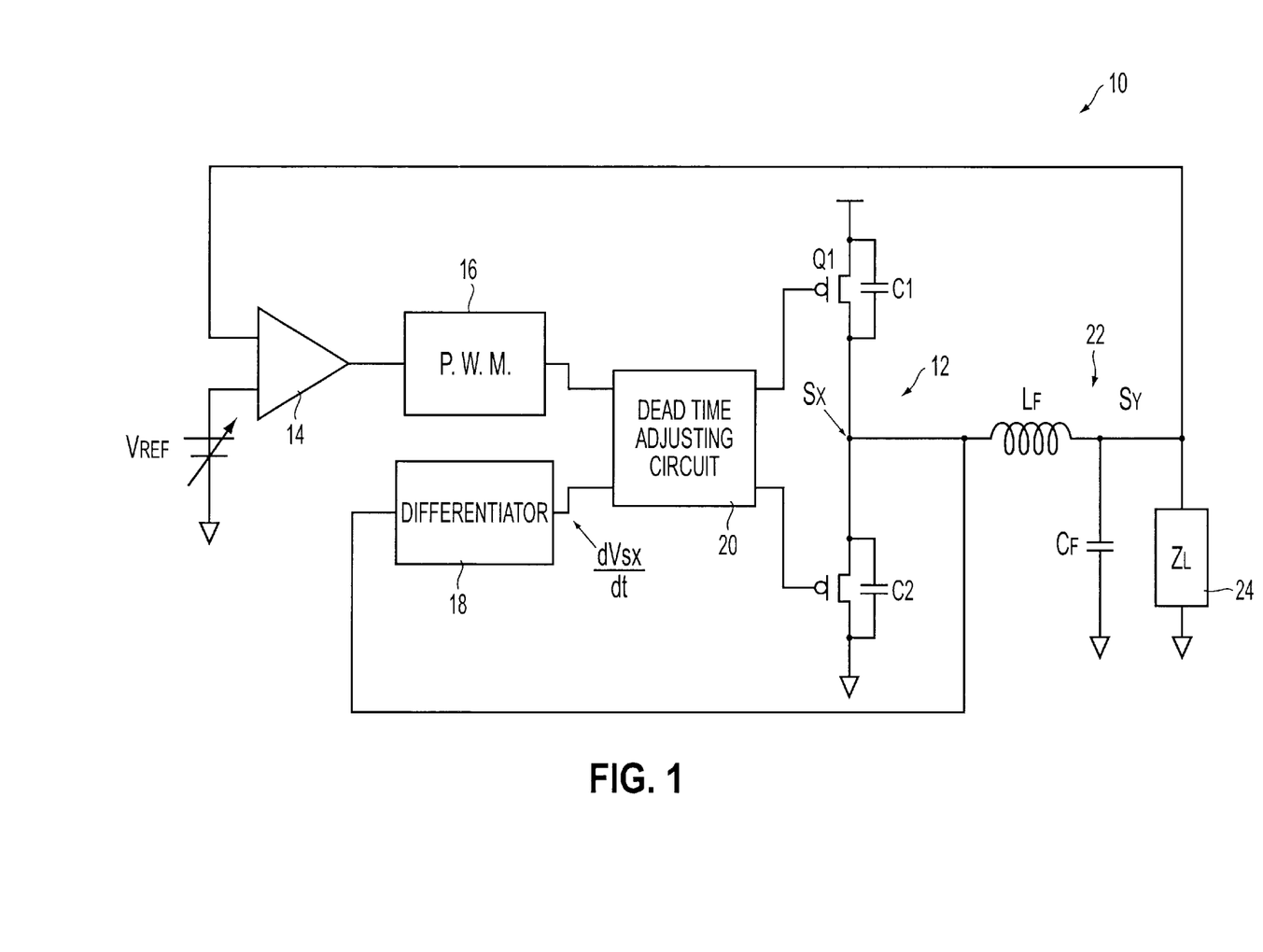
FIG. 1 illustrates a schematic diagram of a soft switching DC-to-DC converter according to the preferred embodiment of the present invention.

This invention will be now described with reference to the accompanying drawings. FIG. 1 illustrates a schematic diagram of a soft switching DC-to-DC converter (hereinafter "converter") according to this invention. Converter 10 shown in FIG. 1 generates a specified DC voltage between the first and second reference voltages. Converter 10 includes Switching circuit 12, Error amplifier 14, and Pulse-width modulator (PWM) 16, Differentiator 18, Dead time adjusting circuit 20, and output filter 22.

Switching circuit 12 includes two switching devices Q1 and Q2 connected in series between a power supply, being the first reference voltage and a ground, being the second reference voltage, and is called a half-bridge type.

Switching device Q1 is a P-channel type metal oxide semiconductor (PMOS) transistor and switching device Q2 is an N-channel type metal oxide semiconductor (NMOS) transistor in the example of FIG. 1. Capacitors C1 and C2 are connected to both ends of Q1 and Q2 in parallel, respectively. MOS transistors are shown in FIG. 1 as an example of switching devices Q1 and Q2; this invention is not limited thereto since well-known switching devices can be adopted as the switching devices Q1 and Q2.

In this embodiment, an output node of Switching circuit 12 is named $S_X$, and an output voltage is expressed VSx. Output filter 22, comprising of inductor $L_F$ and capacitor $C_F$, and load $Z_L$ 24 are shown in FIG. 1. An output node of Output filter 22 is named $S_Y$, and an output voltage is expressed VS$_Y$. Error amplifier 14 compares the voltage VS$_Y$ and the reference voltage V$_{REF}$. When VS$_Y$ is lower than the reference voltage V$_{REF}$, Error amplifier 14 outputs a high-level signal. Whereas when VS$_Y$ is higher than V$_{REF}$, Error amplifier 14 outputs a low-level signal.

PWM 16 adjusts an output pulse width according to the comparison result of Error amplifier 14. PWM 16 lengthens the output pulse width when the high level is given, and shortens the output pulse width when the low level is given.

The above-mentioned Switching circuit 12, Error amplifier 14 and PWM 16 are basic elements of conventional well-known DC-to-DC converters, and can be used in this invention as well.

Differentiator 18 outputs a differentiated signal dVSx/dt of the voltage VS$_X$ at the output node $S_X$ in Switching circuit 12. A well-known operational amplifier and a resistive element etc. can configure Differentiator 18. When the dead time is proper or normal, differentiated signal dVSx/dt does not have a peak, as shown in FIG. 5.

When the dead time A, the period from turning off switching device Q2 to turning on switching device Q1 is shorter than the proper period, differentiated signal dVSx/dt has a peak in a positive direction at the instance Q1 is turned on, and an over current, so-called a spike, is generated, as shown in FIG. 6.

When the dead time A is longer than a proper period, differentiated signal dVSx/dt has a peak in a negative direction at the instance Q1 is turned on, and over current flows, as shown in FIG. 7.

When the dead time B, a period from turning off the switching device Q1 to turning on the switching device Q2 is shorter than a proper period, differentiated signal dVSx/dt has a peak in a negative direction at the instance Q2 is turned on, and over current flows, as shown in FIG. 8.

When the dead time B is longer than a proper period, differentiated signal dVSx/dt has a peak in a positive direction at the instance Q2 is turned on, and over current flows, as shown in FIG. 9.

Thus, a peak appears in differentiated signal dVSx/dt when neither dead time A nor B is optimized at the timing when the over current flows through the switching devices Q1 and Q2.

Dead time adjusting circuit 20 can easily detect the peak in differentiated signal dVSx/dt. As a result, a period of the dead time A and B can be effectively adjusted by using differentiated signal dVSx/dt.

Dead time adjusting circuit 20 adjusts the dead time by properly switching on and/or off the switching devices Q1 and Q2. In particular, Dead time adjusting circuit 20 detects the peak in differentiated signal dVSx/dt, then optimizes the period of the dead time A and or B. Dead time adjusting circuit 20 is disclosed hereinafter by preferred embodiment.

Figure 2:
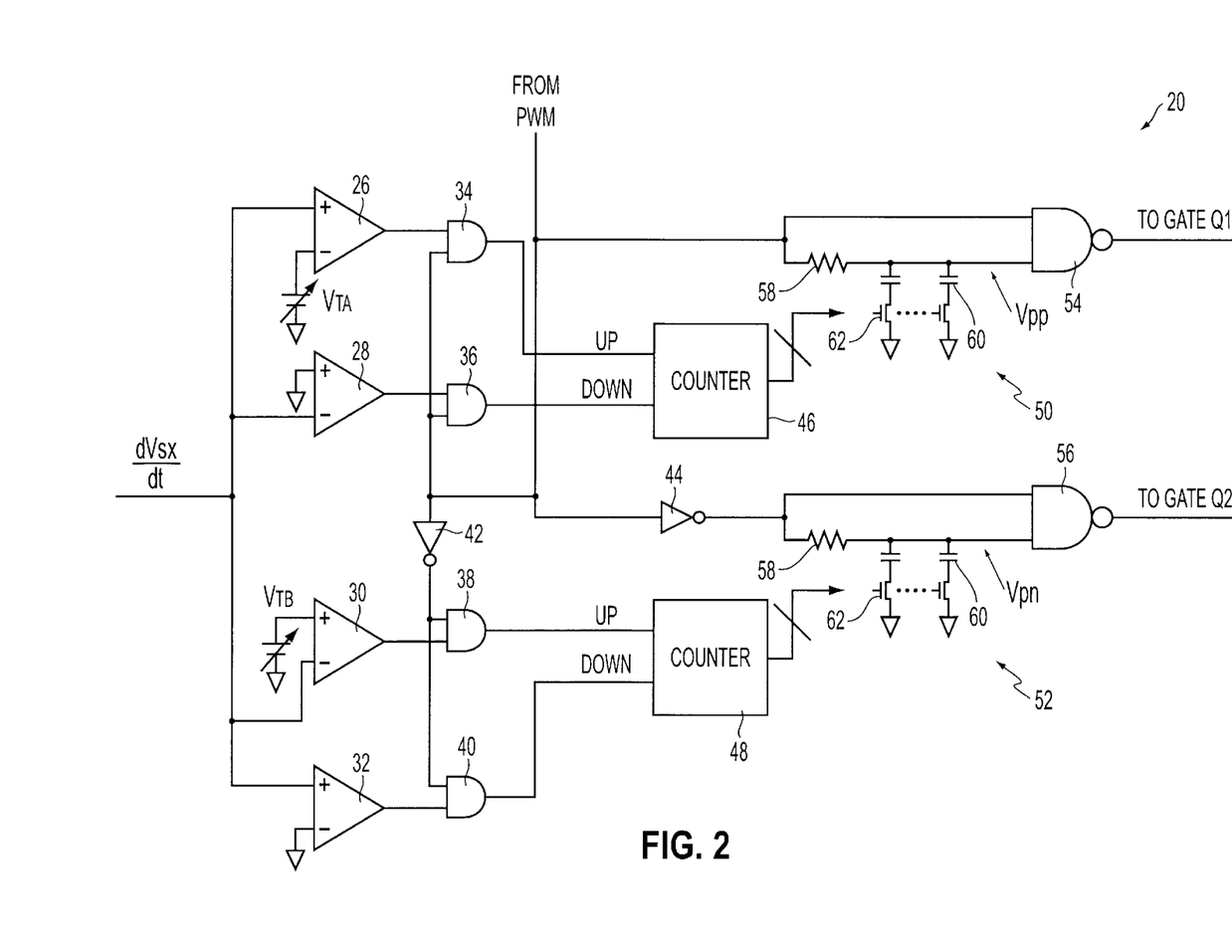
FIG. 2 illustrates a schematic diagram of a dead time adjusting circuit according to the preferred embodiment of the present invention.

FIG. 2 illustrates a schematic diagram of the Dead time adjusting circuit 20. Dead time adjusting circuit 20 includes Comparators 26, 28, 30, 32, AND gates 34, 36, 38, 40, Inverters 42, 44, Counters 46, 48, Delay circuits 50, 52, NAND gate 54, and AND gate 56.

Differentiated signal dV$_{SX}$/dt of the output voltage VS$_X$ at the output node $S_X$ in Switching circuit 12 is input to plus terminal of Comparators 26 and 32 and also to minus terminals of Comparator 28 and 30. Reference value VTA is input to the minus terminal of Comparator 26. Reference value VTB is input to plus terminal of Comparator 30. Plus terminal of Comparator 28 and minus terminal of Comparator 32 are grounded. The output signal from Comparators 26, 28, 30, and 32 are input to an input terminal of AND gates 34, 36, 38, and 40, respectively.

The output pulse from PWM 16 is input to another input terminal of AND gates 34 and 36. The output pulse from PWM 16, reversed by Inverter 42, is input to another input terminal of AND gates 38 and 40. The output signal of the AND gates 34, 36, 38, 40 is input to UP terminal and DOWN terminal of Counter 46 and 48.

Delay circuits 50 and 52 include register 58, two or more capacitors 60, and two or more NMOS transistors 62. Register 58 is connected between an input terminal and an output terminal of Delay circuits 50 and 52. Pairs of Capacitors 60 and NMOS transistors 62 are connected between the input terminal of NAND gate 54 or AND gate 56 and ground, in series. The output signal from Counters 46 and 48 is input to gates of NMOS transistors 62 in Delay circuits 50 and 52.

The output pulse from PWM 16 is input to an input terminal of NAND gate 54. The output pulse from PWM 16, delayed by Delay circuit 50, is input to another input terminal of NAND gate 54. NAND gate 54 outputs the output pulse to the gate of PMOS transistor of the Switching device Q1 in Switching circuit 12.

The output pulse from PWM 16 reversed by Inverter 44 is input to an input terminal of AND gate 56. The output pulse from PWM 16 reversed by Inverter 44 and delayed by Delay circuit 52 is input to another input terminal of AND gate 56. AND gate 56 outputs the output pulse to the gate of NMOS transistor of the Switching device Q2 in Switching circuit 12.

Figure 3A:
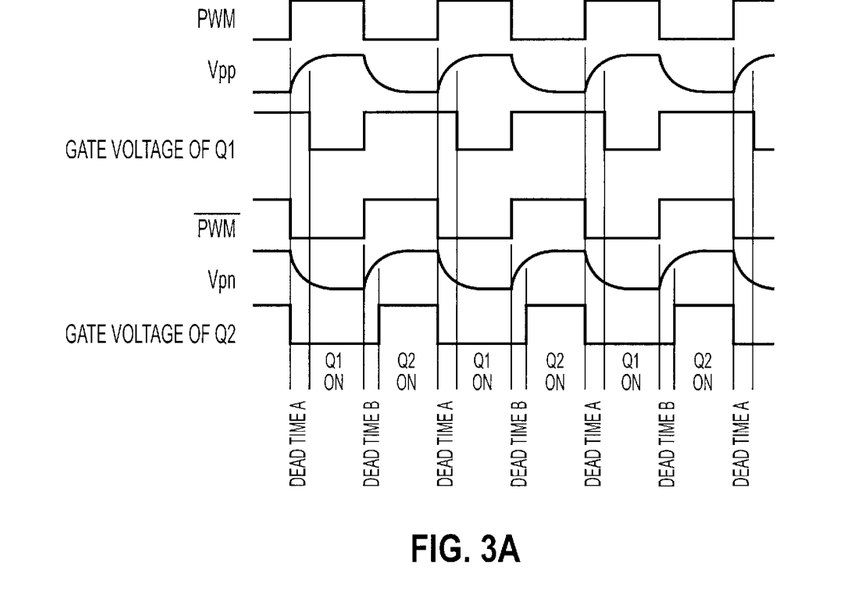
FIG. 3 illustrates the principal operation charts or waveforms of the dead time adjusting circuit.
Figure 3B:
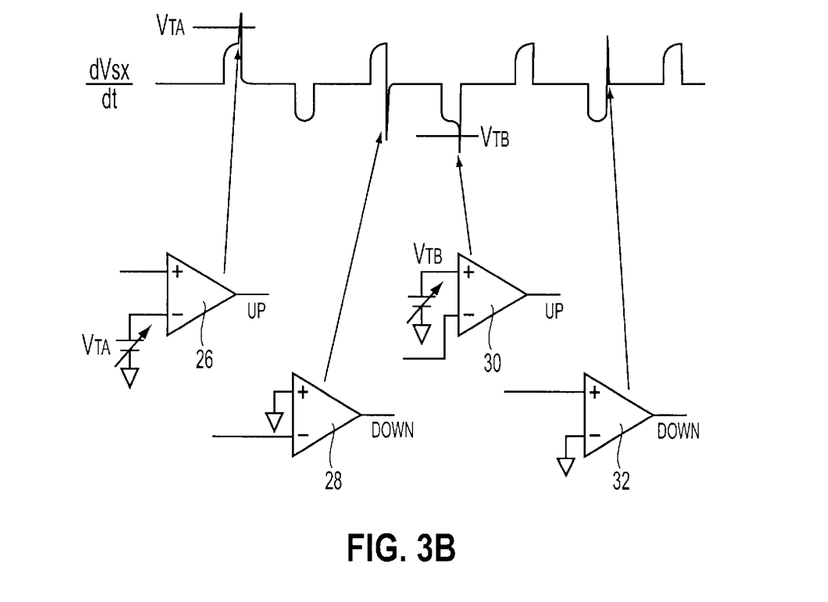

Comparators 26, 28, 30, and 32 compare differentiated signal dVSx/dt from Differentiator 18 with each corresponding reference-signal. Comparator 26 detects a peak in the positive direction appeared in differentiated signal dVSx/dt when the period of dead time A, from turning off of Switching device Q2 to turning on of Switching device Q1, is shorter than a normal period as shown in FIGS. 3 and 6. Comparator 26 becomes high-level when the value of differentiated signal dVSx/dt is larger than the reference value VTA, and becomes low-level when dVSx/dt is smaller than the reference value VTA.

Comparator 28 detects a peak in a negative direction appeared in differentiated signal dVSx/dt when the period of dead time A, from turning off of Switching device Q2 to turning on of Switching device Q1, is longer than a normal period as shown in FIGS. 3 and 7. Comparator 28 becomes high-level when the value of differentiated signal dVSx/dt is smaller than the reference ground, and becomes low-level when dVSx/dt is larger than the reference ground.

Comparator 30 detects a peak in the negative direction that appears in differentiated signal dVSx/dt when the period of dead time B, from turning off Switching device Q1 to turning on Switching device Q2, is shorter than a normal period, as shown in FIGS. 3 and 8. Comparator 30 becomes high-level when the value of differentiated signal dVSx/dt is smaller than the reference value VTB, and becomes low-level when dVSx/dt is larger than the reference value VTB.

Comparator 32 detects a peak in the positive direction that appears in differentiated signal dVSx/dt when the period of dead time B, from turning off Switching device Q1 to turning on Switching device Q2, is longer than a normal period, as shown in FIGS. 3 and 9. Comparator 32 becomes high-level when the value of differentiated signal dVSx/dt is larger than the reference ground, and becomes low-level when dVSx/dt is smaller than the reference ground.

Reference value VTA is set to a higher value than the value of differentiated signal dVSx/dt when the dead time A is normal. Similarly, reference value VTB is set to a lower value than the value of differentiated signal dVSx/dt when the dead time B is normal. Detecting accuracy of the peak can be easily adjustable by changing the reference values VTA, VTB, and ground.

Output signal from Comparators 26 and 28 is supplied to Counter 46 only when the period output pulse from PWM 16 is high-level, which is in dead time A, through AND gates 34 and 36. Output signal from Comparators 30 and 32 is supplied to Counter 48 only when the period output pulse from PWM 16 is low-level, which is in dead time B, through AND gates 38 and 40.

Counters 46 and 48 count up when the high-level is given to the UP terminal of them, and count down when the high-level is given to the DOWN terminal. Counters 46 and 48 maintain present count value when both the UP and DOWN terminals are low-level, which means the period of dead time A and B are proper or normal.

Dead time adjusting circuit 20, shown in FIG. 2, compares the value of differentiated signal dVSx/dt with four reference values. Comparator 26 detects when dead time A is short and counts up Counter 46, when the output pulse from PWM 16 is in high-levels. Comparator 28 detects when dead time A is long and counts down Counter 46. Comparator 30 detects when dead time B is short and counts up Counter 48, when the output pulse from PWM 16 is in low-levels. Comparator 32 detects when dead time B is long and counts down Counter 48.

Delay circuit 50 delays output pulse signal from PWM 16 by resistance capacitance delay decided by the capacitance value of the total Capacitor 60 by the numbers of turned on NMOS transistors 62, corresponding to the count value of Counter 46, and the resistance of Register 58. As a result, NAND gate 54 outputs reversed output signal from PWM 16 that is delayed according to the count value of Counter 46, by which Switching device Q1 turns on.

Delay circuit 52 delays output pulse signal from PWM 16 inverted through Inverter 44 by resistance capacitance delay decided by the capacitance value of the total Capacitor 60 by the number of turned on NMOS transistors 62, corresponding to the count value of Counter 48, and the resistance of Register 58. As a result, AND gate 56 outputs output signal from PWM 16 that is delayed according to the count value of Counter 48, by which Switching device Q2 turns on.

Figure 4:
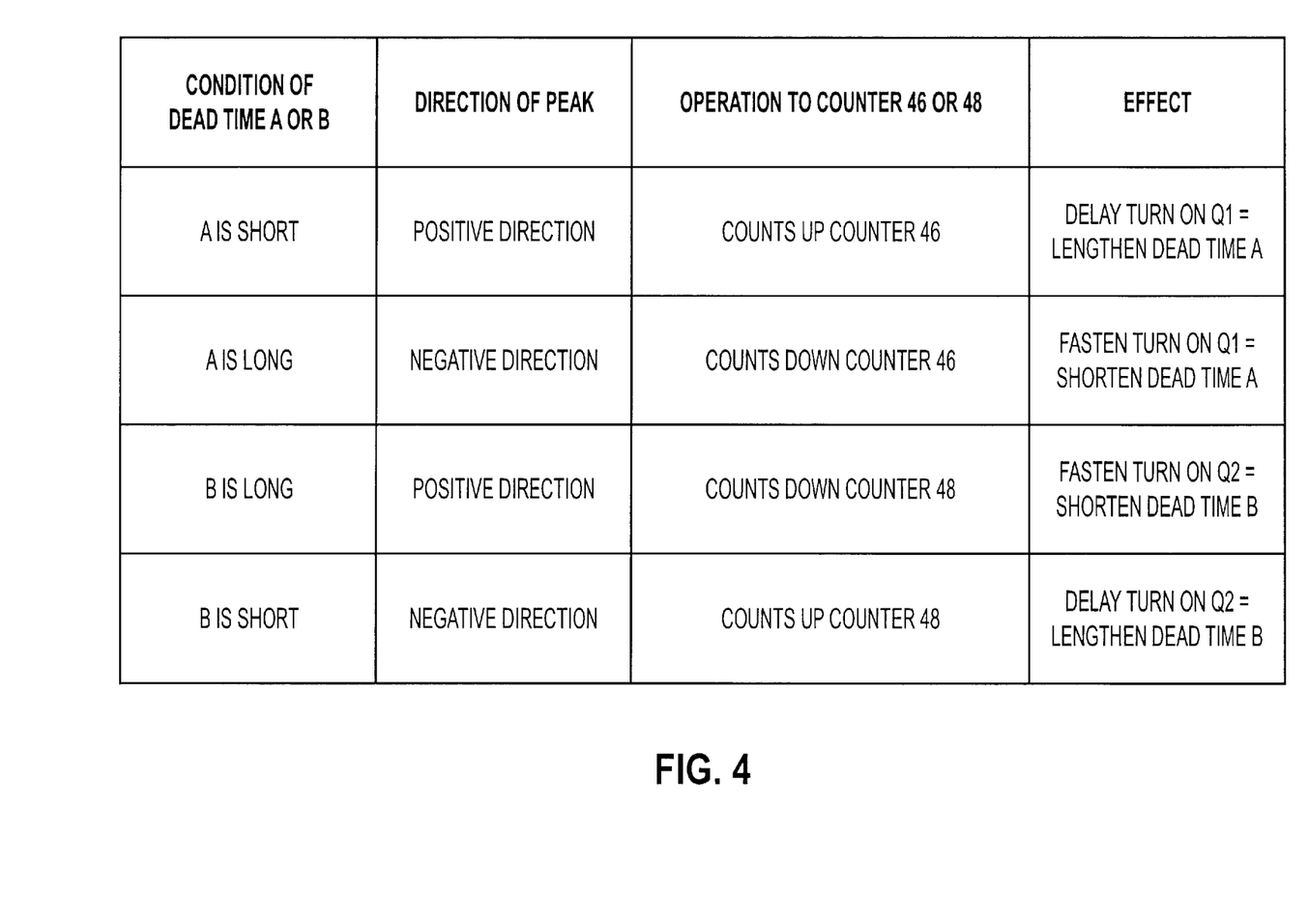
FIG. 4 is a table showing the operation of the dead time adjusting circuit.

FIG. 4 summarizes the operation of Dead time adjusting circuit 20.

Converter 10 of FIG. 1 compares the voltage $V_{SY}$ at output node $S_Y$ with reference voltage $V_{REF}$ in Error amplifier 14. The pulse width of the output pulse from PWM 16, that becomes a source signal which controls two Switching devices Q1 and Q2 is adjusted according to the above mentioned comparison result. As a result, when voltage $V_{SY}$ of output node $S_Y$ is lower than that of reference voltage $V_{REF}$, Q1 is controlled to turn on longer. When voltage $V_{SY}$ of output node $S_Y$ is higher than that of reference voltage $V_{REF}$, Q2 is controlled to turn on longer. Dead time, when both Switching devices Q1 and Q2 turns off, is adjusted in Dead time adjusting circuit 20 based on differentiated signal dVSx/dt given from Differentiator 18.

Dead time is finally adjusted for the best period while the above-mentioned operation is repeated. Soft switching DC-to-DC converter of this invention is basically the above-mentioned.

Although the invention has been described with respect to specific half-bridge soft switching DC-to-DC converter embodiments for complete and clear disclosure, the appended claims are not to be thus limited, but are to be construed as embodying all modification and alternative constructions that may occur to one skilled in the art, including full-bridge converters, which fall within the basic teachings set forth herein.

What is claimed is:

1. A soft switching DC-to-DC converter comprising:
    a differentiator that calculates a derivative of a voltage of a node representing output of at least two switching elements, connected in series between a first reference voltage and a second reference voltage and outputs a differentiated signal representing the time derivative; and
    a dead time adjusting circuit that adjusts a period of dead time of the at least two switching elements when the differentiated signal indicates an over current at the node, wherein the dead time adjusting circuit comprises at least one comparator which detects positive and negative peaks in the differentiated signal, and at least one counter which is incremented when the at least one comparator detects one of a positive or negative peak.

2. The soft switching DC-to-DC converter of claim 1, further comprising:
    an error amplifier that compares an output voltage of an output node with a reference voltage and outputs a comparison result; and a pulse-width modulator that adjusts a pulse width of an output pulse according to the comparison result of the error amplifier.

3. The soft switching DC-to-DC converter of claim 1, wherein the at least two switching elements form an inverter.

4. The soft switching DC-to-DC converter of claim 1, wherein said dead time adjusting circuit adjusts the period of dead time by detecting a peak value of the differentiated signal.

5. A soft switching DC-to-DC converter comprising:
   a differentiator that calculates a derivative of a voltage of a node representing output of at least two switching elements, connected in series between a first reference voltage and a second reference voltage and outputs a differentiated signal representing the time derivative; and
   a dead time adjusting circuit that adjusts a period of dead time of the at least two switching elements when the differentiated signal indicates an over current at the node, wherein said dead time adjusting circuit comprises:
      at least one comparator;
      at least one AND gate;
      at least one inverter;
      at least one counter;
      at least one delay circuit; and
      at least one NAND gate.

6. The soft switching DC-to-DC converter of claim 1, wherein at least one of the at least two switching elements is a P-channel type metal oxide semiconductor.

7. The soft switching DC-to-DC converter of claim 1, wherein at least one of the at least two switching elements is an N-channel type metal oxide semiconductor.

8. The soft switching DC-to-DC converter of claim 1, wherein the dead time adjusting circuit adjusts said period of dead time by turning off at least one of the at least two switching elements based on the differentiated signal.

9. The soft switching DC-to-DC converter of claim 1, wherein the dead time adjusting circuit adjusts a period of dead time by turning off the at least two switching elements based on the differentiated signal.

10. A method of controlling a soft switching DC-to-DC converter comprising:
    generating a differentiated signal representing the time derivative of a node voltage between at least two switching elements; and
    adjusting a period of dead time of the at least two switching elements when the differentiated signal indicates an over current at the node,
    wherein adjusting a period of dead time comprises comparing the differentiated signal with at least one reference signal and incrementing at least one counter when the comparison indicates an over current at the node.

11. The method of controlling the soft switching device of claim 10, further comprising:
    comparing an output voltage of an output node with a reference voltage and outputting a comparison result; and
    adjusting a pulse width of an output pulse according to the comparison result.

12. The method of controlling the soft switching device of claim 10, further comprising:
    detecting a peak value of the differentiated signal.

13. A method of controlling a soft switching DC-to-DC converter comprising; generating a differentiated signal representing the time derivative of a node voltage between at least two switching elements; and
    adjusting a period of dead time of the at least two switching elements when the differentiated signal indicates an over current at the node,
    wherein said adjusting of said period of dead time is accomplished by using at least one comparator, at least one AND gate, at least one inverter, at least one delay circuit and at least one NAND gate.

14. The method of controlling the soft switching device of claim 10, further comprising:
    turning off the at least one of the at least two switching elements based on the differentiated signal.

15. The method of controlling the soft switching device of claim 10, further comprising:
    turning off at least two of the at least two switching elements based on the differentiated signal.

* * * * *